March 9, 1965  A. BERTOLD ETAL  3,172,588
VIBRATING METHOD AND APPARATUS
Filed Nov. 7, 1963  5 Sheets-Sheet 1
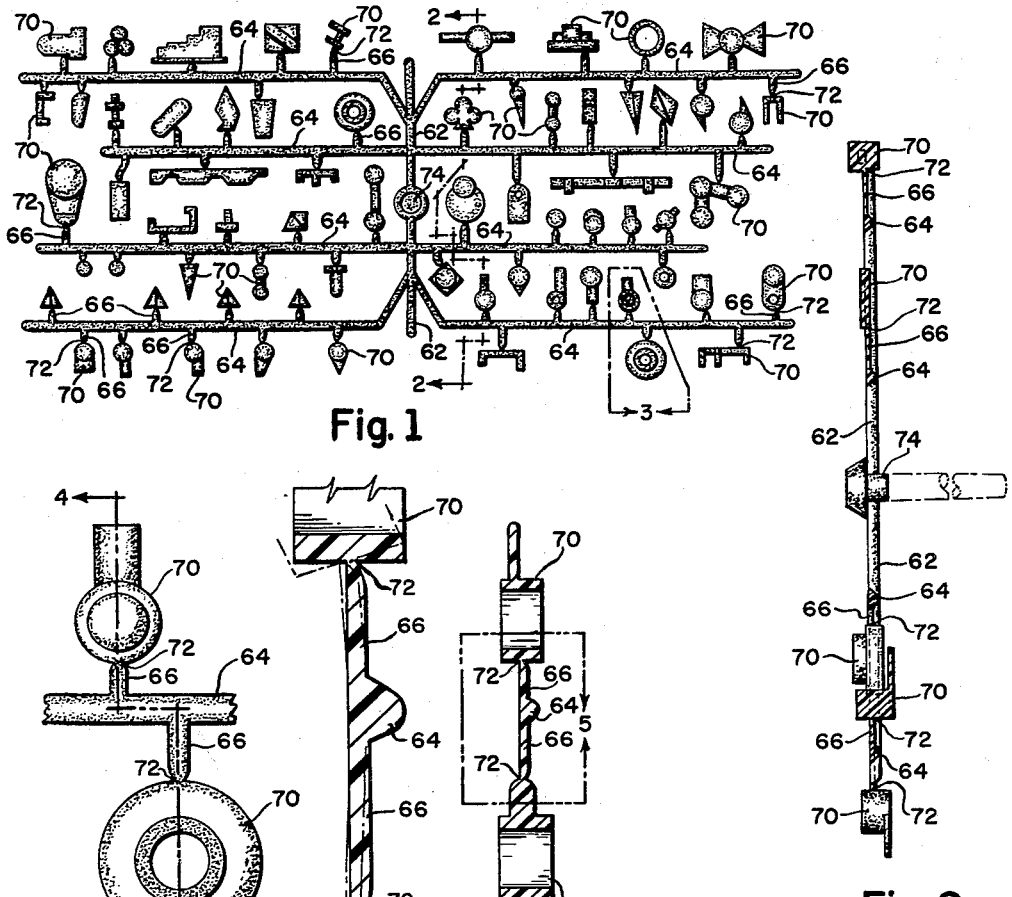
Fig. 1
Fig. 2
Fig. 3
Fig. 4
Fig. 5
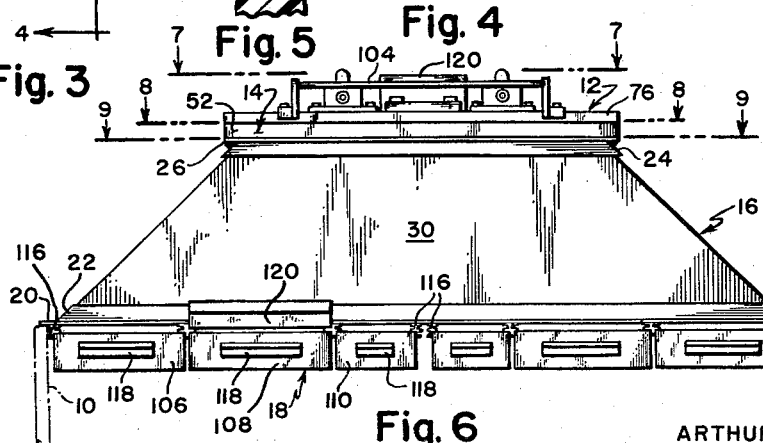
Fig. 6
INVENTORS.
ARTHUR BERTOLD
EARL LEE SPITZER
BY John Cyril Malloy
ATTORNEY

INVENTORS.
ARTHUR BERTOLD
EARL LEE SPITZER

BY John Cyril Malloy
ATTORNEY

March 9, 1965   A. BERTOLD ETAL   3,172,588
VIBRATING METHOD AND APPARATUS
Filed Nov. 7, 1963   5 Sheets-Sheet 3

INVENTORS.
ARTHUR BERTOLD
EARL LEE SPITZER

BY *John Cyril Malloy*
ATTORNEY

March 9, 1965 A. BERTOLD ETAL 3,172,588
VIBRATING METHOD AND APPARATUS
Filed Nov. 7, 1963 5 Sheets-Sheet 4
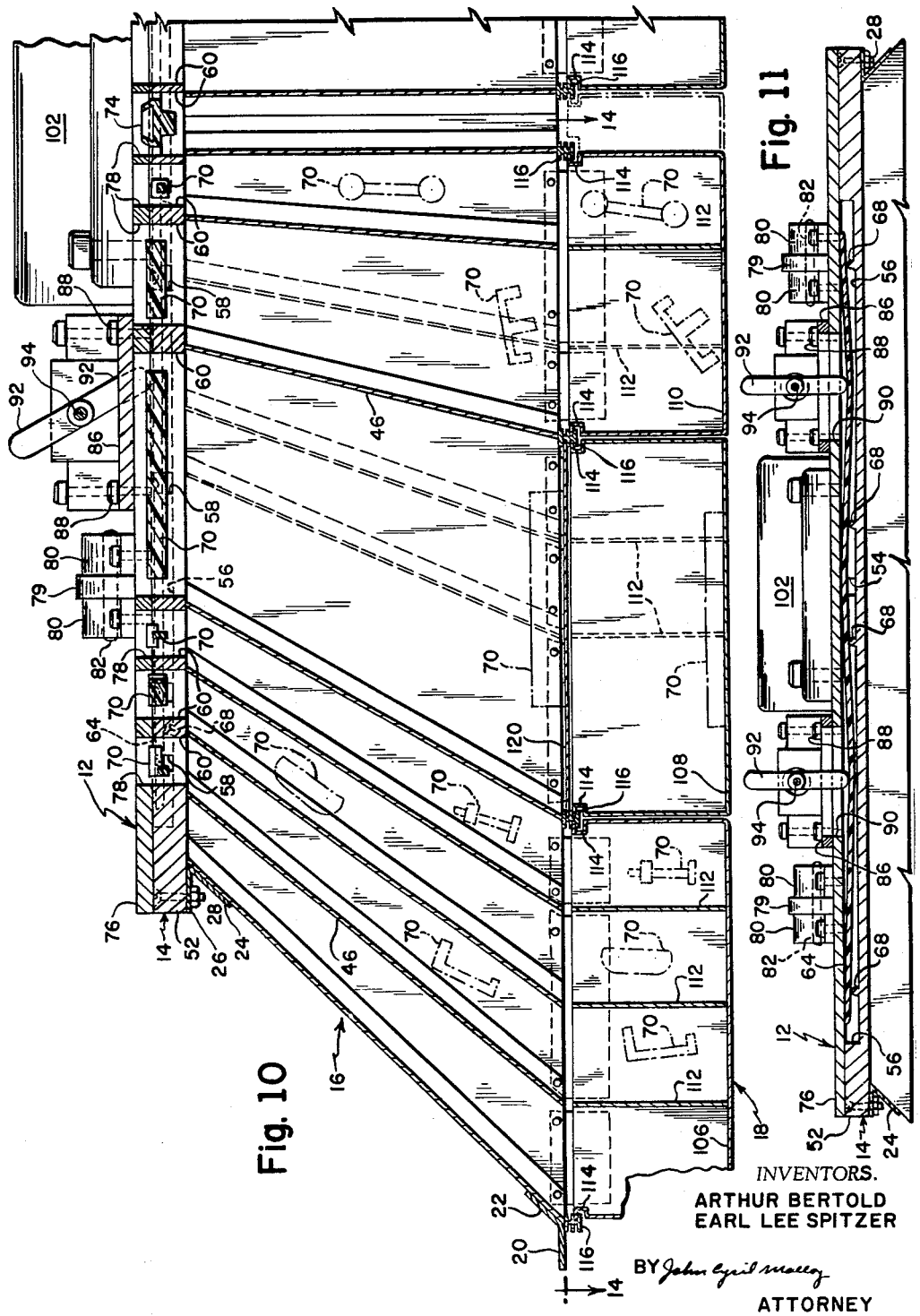
INVENTORS.
ARTHUR BERTOLD
EARL LEE SPITZER
BY John Cyril Malloy
ATTORNEY

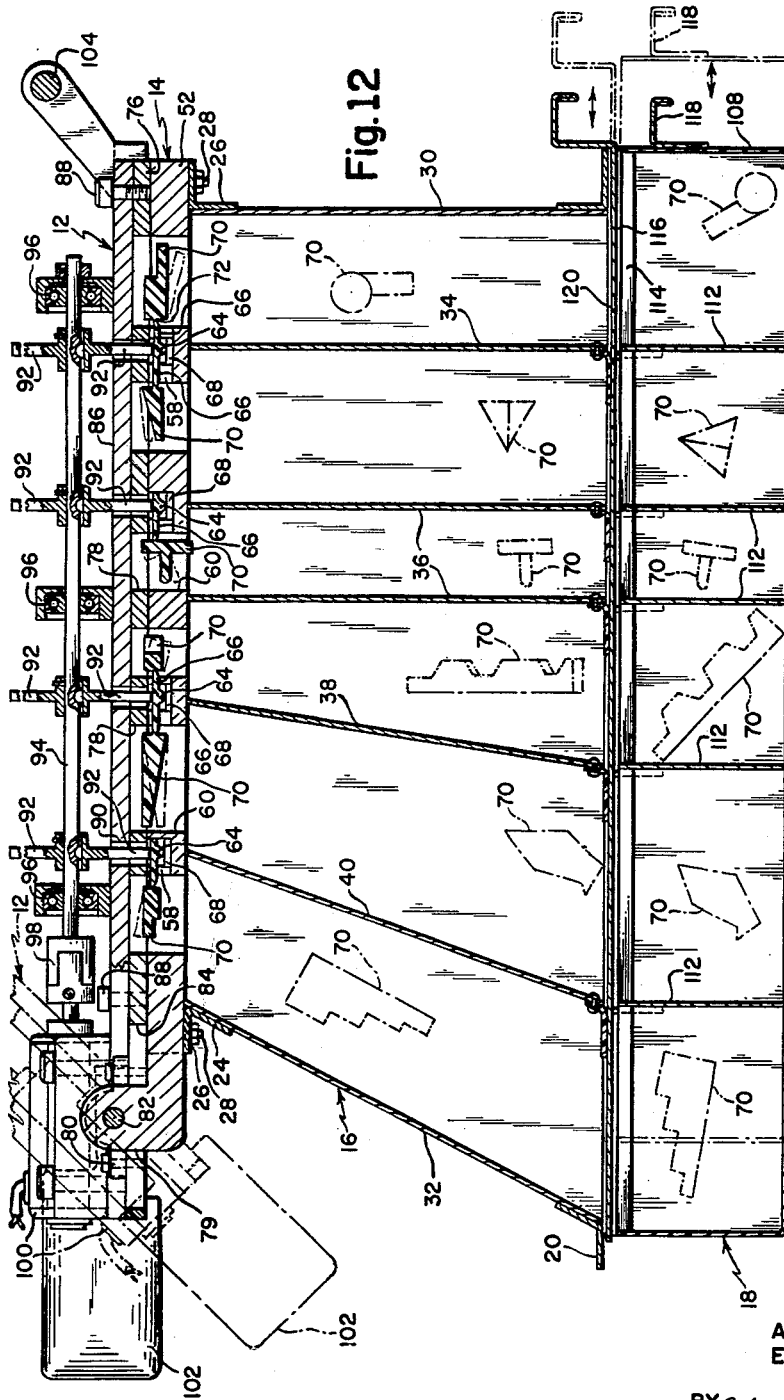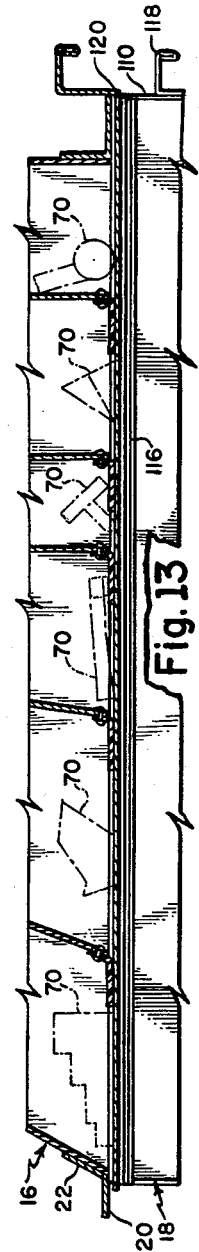

United States Patent Office 3,172,588
Patented Mar. 9, 1965

3,172,588
VIBRATING METHOD AND APPARATUS
Arthur Bertold, Miami, and Earl Lee Spitzer, Hialeah, Fla., assignors to Frederic Wise and Norman H. Cohan, both of Dade County, Fla.
Filed Nov. 7, 1963, Ser. No. 322,291
16 Claims. (Cl. 225—93)

This invention relates to a device for separating molded articles from their runner systems, also variously referred to as gates or sprues, and particularly to the handling of molded plastics.

Conventionally, such articles are "degated," or separated, by shearing action, or rupture by flexing, at each zone of connection, which entails undue consumption of time, whether accomplished separately, or in multiple, and it is therefore an object of the invention to minimize the time involved in separation.

Conventional methods also present another difficulty in that they do not result in clean, or uniform breaks, and are seldom free of vestiges of the gate or runner. It is, therefore, a further object of the invention to improve the character of the cleavage in separating molded articles, and accomplish scrap removal in maximum.

Yet another object is to achieve the foregoing, in conjunction with a system wherein a variety of shapes on a single molded chain, are retained in homogeneous groups after separation.

A still further object is to achieve separation by means of applied vibrations.

These and other objects, which will be apparent, are attained by the present invention, a preferred form of which is described in the following specification, as illustrated in the drawing, in which:

FIG. 1 is a plan view of a representative connected group of variously shaped, molded, plastic components;

FIG. 2 is a sectional view through the integrated group of components, taken along the staggered line 2—2 of FIG. 1;

FIG. 3 is an enlarged view of a detail included in the area boxed by the arrowheaded, broken line 3, in FIG. 1;

FIG. 4 is a sectional view taken along the staggered line 4—4 in FIG. 3;

FIG. 5 is an enlarged view of a detail in FIG. 4 in the region boxed by the arrowheaded, broken line 5, therein;

FIG. 6 is a front elevational view of the separating machine.

Figure 7:
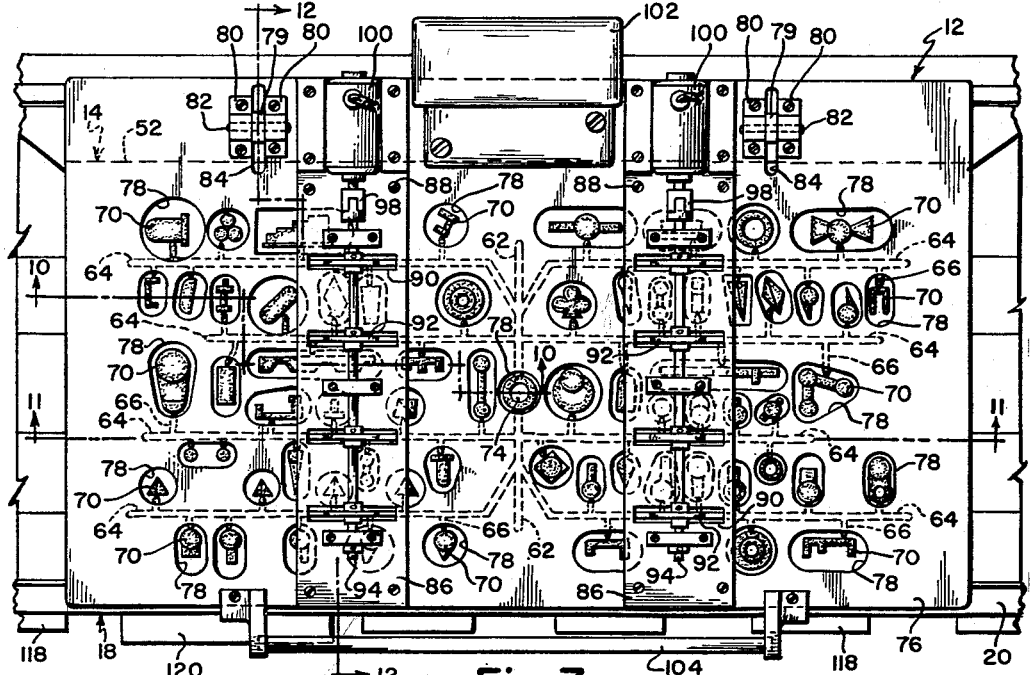
FIG. 7 is a partial, top plan view, enlarged, of the device of FIG. 6, as limited by the line 7—7 of FIG. 6.
Figure 8:
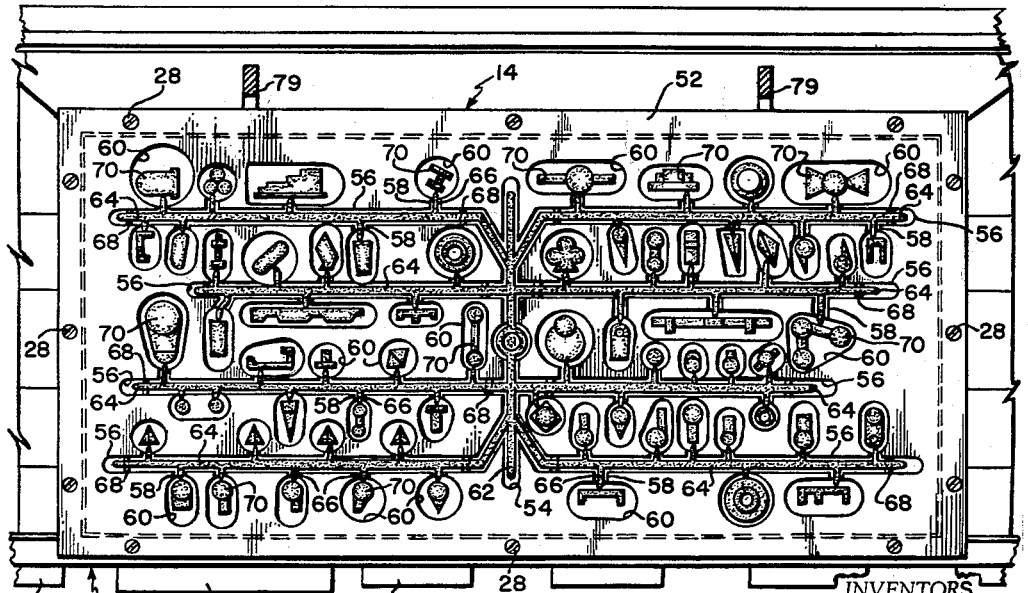
Figure 9:
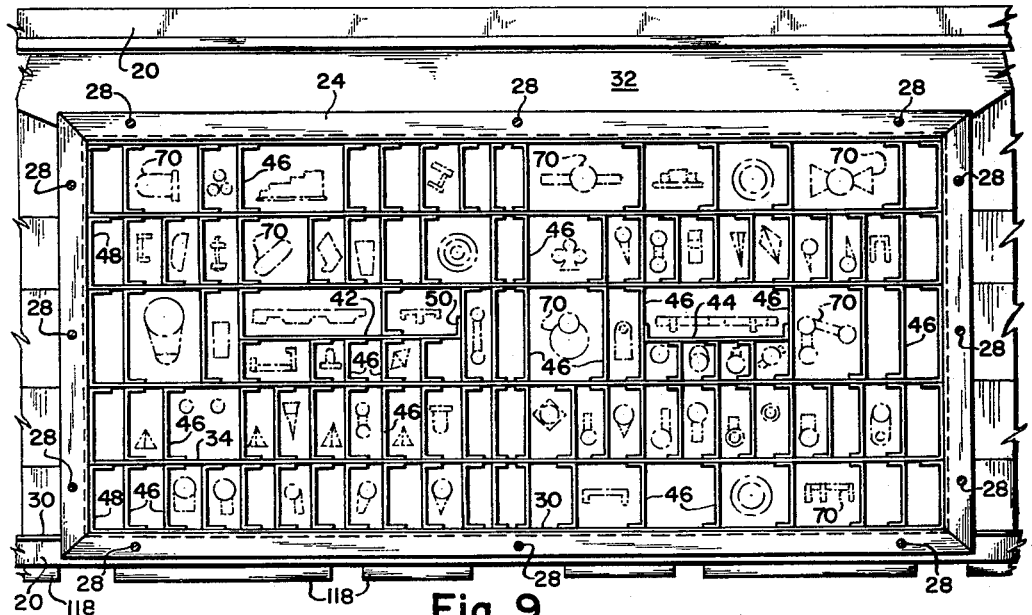
Figure 14:
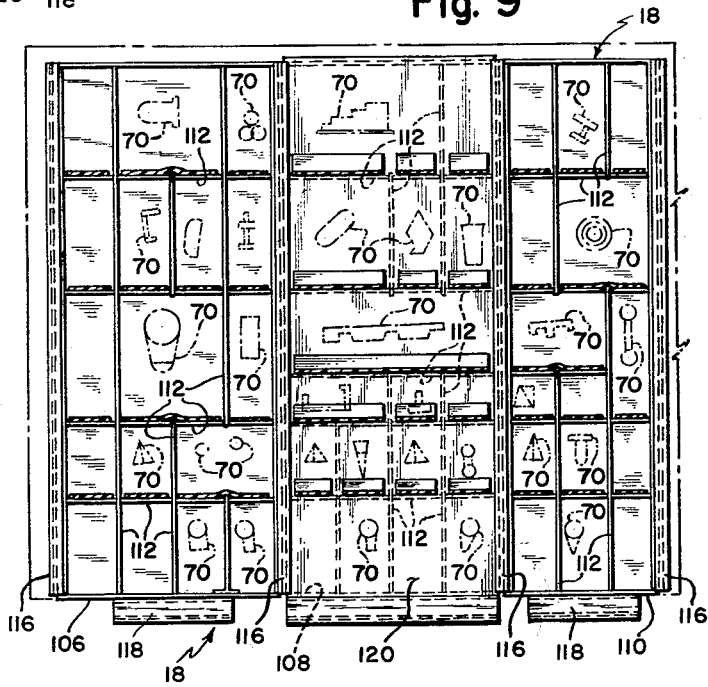

FIGS. 8 and 9 are horizontal, sectional views, enlarged, taken respectively, on the planes of the lines 8 and 9 of FIG. 6;

FIG. 10 is a partial, vertical, sectional view, enlarged, taken on the plane of the staggered line 10—10 of FIG. 7;

FIG. 11 is another vertical, sectional view, taken on the plane of the line 11—11 of FIG. 7, enlarged somewhat over the scale of FIG. 7, but less than that of FIG. 10;

FIG. 12 is still another vertical, sectional view, enlarged, taken on the plane of the staggered line 12—12 of FIG. 7;

FIG. 13 is a view similar to FIG. 12, showing a fragment of the lower part thereof, with a receiving drawer removed; and FIG. 14 is a horizontal, sectional view, taken on the plane of the line 14—14 of FIG. 10, and reduced in scale.

Referring to the drawings by characters of reference, there is shown a system in the form of a work table, supported on legs 10 (FIG. 6), and comprising four main parts, including a swingable cover 12, providing the vibratory mechanism, a positioning tray 14 for the integrated plurality of molded articles, a pyramidal, chute section 16, and a lowermost, receiving-drawer section 18, which will be separately described, in detail.

The entire system is supported on legs 10 by dwell thereon of the horizontal flange 20 of an angle strip, the upper flange 22 of which is secured, as by soldering, brazing, or welding, to the lower edge of the chute section 16.

At will be clear from several of the horizontal areas illustrated, and FIG. 12, pyramidal chute section 16 is vertical on the front side, and slanted on the two sides and the rear, in a downwardly diverging sense, so that the upper flange 22 of the angle strip will be arranged at an obtuse angle on three sides, and at a right angle on the front. The top edge of chute section 16 is reinforced by another angle strip 24, also conforming to the pyramidal shape, and having a horizontal flange 26, to which tray 14 is secured, as by stove bolts 28.

The structural scheme for the honeycomb of chutes in section 16 will be, in part, apparent from FIG. 9, with a first, main division provided by a series of laterally running, plates, including a vertical, front wall 30, and a rear slant wall 32, between which are a plurality of partition walls, including two vertical walls 34, 36 (FIG. 12), in the forward part, and two slant walls 38, 40, in the rearward part. The layout of chutes may be further subdivided, two comport with the configuration of the molded aggregate, by means of short sections of partition walls, such as walls 42, 44 (FIG. 9).

The front-to-rear, or depthwise partitions of the chutes are provided either by rectangularly channel-form members, or by hook-form ends on the laterally running partitions. The channel members, to avoid confusion, are for the most part all indicated by the same reference numeral 46, although it will be apparent from FIG. 9 that these may occur in various widths throughout the system. Likewise, the hooked ends of the partitions, which are not unlike the channels in structure and function, are all indicated by the numeral 48. As a further variation, the short partition 44 is shown as a wide channel member, rather than a hooked member, and the hooked-end partition 42 is shown as having a flanged end 50. In all cases, the channel walls, and the flanges of the hooked ends make surface contact with the laterally running partitions. The channel members will be cut on the bias, or of skewed form, in conformity with the divergent form of the chute section as a whole.

The tray 14 comprises a thick, rectangular plate 52, chiefly characterized by the fact that it has a network of grooves for receiving the runners and gates of the molded product, and apertures located to register with the several molded articles. In this respect, the tray bears a very general resemblance to the mold in which the product was formed. Thus, the plate has a central, front-to-rear groove 54, and running laterally from each side of the central groove are the communicating, branch grooves, eight in number, as shown, and which, for simplicity, are all designated by the same numeral 56, although differing somewhat in length, and in their approach to the central groove. A still further set of short, branch grooves 58, lead outwardly from side grooves 56 and communicate with apertures in the plate, all of which are designated by the numeral 60, although they appear in a variety of shapes, including, but not limited to, circular, elliptical, and generally triangular, in conformity with the sizes and shapes of the molded articles on the "tree," which is shown separately in FIG. 1. Of this configuration, the central runner 62 is receivable in its corresponding groove 54 of plate 52, side runners 64 are receivable in grooves 56, and the necks 66, which may be referred to as "gates", as residue from the gate leading into the mold cavity, are received in short grooves 58.

Parts 66 are shown in magnified form in FIGS. 3–5, and it is important to note that the side runners 64 have a bulbous form of cross section, and extend substantially below the lowermost sides of gates 66, so that the gates may oscillate up and down in their grooves 58, about their region of attachment with runner 64, after the manner of the branches of a tree, when shaken, as indicated by the broken lines in FIG. 5. The runners 64, in turn, are also subject to a degree of flexure by virtue of their mounting in grooves 56, wherein they are supported, beam fashion, on laterally disposed lugs 68, located in pairs, at spaced points, in each lateral groove 56 (FIG. 11).

The end products of the molding process are indicated in the molded "tree" in great variety, but since the size and shape of these have no significant relation to the subject matter of the present invention, these have all been indicated by the same reference character, 70. As seen in FIGS. 3 and 5, the outer ends of gates 66 are curved, doubly in a horizontal plane, and singly in a vertical plane, to provide highly restricted, neck portions 72, providing for easy rupture and hence separation of pieces 70, due to vibration of runners 64, as communicated to pieces 70 through gates 66, the latter two movements being indicated in dash lines in FIGS. 5 and 12, and the beam flexure of runners 64 being indicated in FIG. 11. Ready location of the molded tree on the tray is provided by a headed dowel, or locator pin, 74, located centrally of the system, and received in a suitable bore in tray 52.

The vibrating system is carried on the top side of the swinging cover 12, which comprises a rectangular plate 76, having a system of through holes 78, registering with the openings 60 in the lower plate 52 (see FIG. 12). As seen in FIG. 12, the lower plate 52 has rearwardly and upstanding lugs 79, extending rearwardly of the chute system, and the hinge connection comprises two pairs of pillow blocks 80, on top of plate 76 near its rear end, which carry pivot pins 82, journalled in the lugs 79, plate 76 having suitable, elongate openings 84, to pass the upstanding lugs 79.

The dual vibrators are carried by a pair of elongate, rectangular plates 86, running from front to rear of cover plate 76, on each side of center thereof, and secured by screws 88, the plates having elongate, rectangular, laterally directed openings 90, running through the cover 76, and registering with the grooves 56 which hold runners 64, so that the latter may be contacted by the beaters. The latter comprise a series of pairs of alingned, radial fingers 92 (FIGS. 10 and 11), fixed to a shaft 94, journalled in bearings 96, and driven through couplings 98 by motors 100, bolted to plate 76. The swinging cover 76 also has a rearwardly extending counter-weight 102 bolted to its rear end, and a forwardly located handle 104, for lifting and closing. Latch means may also be provided, if desired.

In large scale manufacture, it will be feasible to construct the degating jig in exact correspondence with a single molded "tree", as is the case illustrated in the drawings, but it will be understood that a system could be designed which would accommodate a variety of molded products, having less than the maximum number of items, and variously arranged.

Assuming the plural product, as in FIG. 1, to have been removed from the mold, the cover 76 of the jig is swung open, and the "tree" laid in the branched grooves in the tray 52. Here each side runner 64 is elevated above the groove bottom by virtue of two-point support on lugs 68, and is therefore capable of downward flexure, at its middle, by wiping action of the ends of beater fingers 92. The resulting vibratory motion is communicated to short gates 58, which are also elevated, and through them to the end products 70, which are free to move up and down in registering openings 60 and 78. The design of the neck portion 72, at the outer end of the gate is such that the product 70 is separated with a minimum of vibratory action, with all pieces separating almost at once and substantially simultaneously. Thereafter, the pieces fall through the respective chutes into the receiving section 18.

As seen in FIG. 10, the section 18 may comprise a series of drawers, such as 106, 108, 110, which may have a plurality of compartments, separated by fixed partitions 112. Each drawer has its upper edges bent to form a channel-groove bead 114, the upper walls of which is received in the lower of a pair of side grooves in a strip 116 depending from the under side of the chute section. The drawers are provided with handles 118. As a temporary retainer for the articles during periods of removal of the drawers, plates 120 are provided, which are adapted to slide in the upper grooves in strips 116. In FIG. 12, both the drawer 106 and the plate 120 are shown in adjusted positions to demonstrate the sliding movement, and in FIG. 13, the situation is shown wherein a drawer has been completely removed, and the retaining plate is fully inserted.

It will be seen that in the employment of a device as described above, the objects of the invention are attained in ample measure, especially in regard to minimizing operational time and cost, and also in regard to positive, clean-cut cleavages, without vestigates of the scrap material.

Generally speaking, whereas a preferred embodiment has been shown, for illustrative purposes, various modifications will be apparent, in the light of this disclosure, and the invention not, therefore, be deemed as limited, except insofar as shall appear from the spirit and scope of the appended claims.

What is claimed is:

1. A device for degating plastic molded articles comprising a tray having at least one main groove with spaced supports for receiving a runner, and a recess for receiving a molded article integral with said runner, and means to cyclically flex said runner to vibrate it and to shake the article to sever said article from the runner.

2. In a device as in claim 1, a second groove communicating laterally with said main groove and with said recess, and accommodating a branch of said runner.

3. A device is in claim 2, said recess comprising a through opening in said tray.

4. A device as in claim 3, said means comprising a rotary member with radial fingers.

5. A device as in claim 3, said means comprising a cover plate on said tray, having a through opening communicating with said main groove, and a rotary member carried on said cover plate, and having radial fingers adapted to sweep through said through opening into wiping contact with said runner.

6. A device as in claim 5, said cover plate also having through openings registering with the through openings in said tray.

7. In a device as in claim 6, a gravity-disposal, chute section carried by said tray.

8. In a device as in claim 7, at least one drawer carried by said chute section.

9. In a device as in claim 8, means on said chute section having a first pair of grooves slidably receiving said drawer, and a second series of grooves, slidably receiving a plate in overlying relation to said drawer.

10. A device for separating the scrap from molded plastic articles comprising a tray having grooves receiving the plastic produce as molded, and a removable cover on said tray, having vibrator means adapted to intermittently contact said product.

11. A device as in claim 10, said tray having through openings for passage of said articles after separation.

12. A device as in claim 11, said vibrator means comprising a rotary beater, and said cover having an opening providing access to said product by said beater.

13. A device as in claim 12, said cover being hingedly connected to said tray.

14. A device as in claim 10, said product being supported in said tray in a manner to permit flexure of said product under the urging of said beater.

15. The process of degating plastic molded articles from the distal ends of a plastic tree from a mold which tree includes at least one main runner and branches, said plastic molded articles being connected to the distal ends of the branches, comprising the steps of supporting the said runner at two spaced points and cyclically flexing the runner to vibrate the plastic articles and to shake them from the tree.

16. The process as set forth in claim 15 including the step of separating the articles by constraining them upon severance from the tree to predetermined paths leading to separate collection points.

References Cited by the Examiner
UNITED STATES PATENTS

| | | | |
|---|---|---|---|
| 1,957,078 | 5/34 | Robillard | 225—103 |
| 2,615,567 | 10/52 | Campbell | 209—85 X |

ANDREW R. JUHASZ, *Primary Examiner.*